(12) United States Patent
Salamah et al.

(10) Patent No.: US 7,342,345 B2
(45) Date of Patent: Mar. 11, 2008

(54) PADDLED ROTOR SPACEBLOCKS

(75) Inventors: Samir A. Salamah, Niskayuna, NY (US); Nishant Parsania, Karnatak, IN (US)

(73) Assignee: General Electric Company, Schenectady, NY (US)

( * ) Notice: Subject to any disclaimer, the term of this patent is extended or adjusted under 35 U.S.C. 154(b) by 166 days.

(21) Appl. No.: 11/163,740

(22) Filed: Oct. 28, 2005

(65) Prior Publication Data
US 2007/0096590 A1    May 3, 2007

(51) Int. Cl.
*H02K 3/46* (2006.01)
(52) U.S. Cl. .......................... 310/270; 310/52
(58) Field of Classification Search .......... 310/52, 310/58–59, 61, 65, 270
See application file for complete search history.

(56) References Cited

U.S. PATENT DOCUMENTS

| | | | |
|---|---|---|---|
| 6,340,853 B1 | 1/2002 | Kaiho et al. | |
| 6,346,754 B1 * | 2/2002 | Kieda et al. | 310/58 |
| 6,392,326 B1 | 5/2002 | Turnbull et al. | 310/270 |
| 6,417,586 B1 | 7/2002 | Jarczynski et al. | 310/61 |
| 6,452,294 B1 | 9/2002 | Vandervort et al. | 310/64 |
| 6,465,917 B2 | 10/2002 | Wetzel et al. | 310/61 |
| 6,495,943 B2 | 12/2002 | Wetzel et al. | 310/264 |
| 6,617,749 B2 | 9/2003 | Salamah et al. | 310/270 |
| 6,628,020 B1 | 9/2003 | Tong | 310/61 |
| 6,720,687 B2 | 4/2004 | Salamah et al. | 310/61 |
| 6,870,299 B1 | 3/2005 | Moelecker et al. | |
| 2002/0079784 A1 | 6/2002 | Slamah | |

FOREIGN PATENT DOCUMENTS

| | | |
|---|---|---|
| EP | 1544979 A2 | 6/2005 |
| JP | 58049063 | 3/1983 |

* cited by examiner

*Primary Examiner*—Thanh Lam
(74) *Attorney, Agent, or Firm*—Sutherland Asbill & Brennan LLP

(57) ABSTRACT

A dynamoelectric machine cooled by a gas flow. The machine may include a rotor, an endwinding extending axially beyond the rotor, a spaceblock located about the endwinding, and a passageway positioned about the spaceblock. The spaceblock may include a C-channel extending into the passageway so as to deflect the gas flow into an axial direction.

12 Claims, 6 Drawing Sheets

PADDLED ROTOR SPACEBLOCKS

TECHNICAL FIELD

The present invention relates generally to generator rotors and more particularly relates to enhanced cooling of generator rotors by the use of paddled spaceblocks.

BACKGROUND OF THE INVENTION

The power output rating of dynamoelectric machines, such as large turbo-generators, is often limited by the ability to provide additional current through the rotor field winding because of temperature limitations imposed on the electrical conductor insulation. Effective cooling of the rotor winding contributes directly to the output capability of the machine. This is especially true in the rotor end region, where direct, forced cooling is difficult and expensive. As prevailing market trends require higher efficiency and reliability in lower cost, higher-power generators, cooling the rotor end region becomes a limiting factor.

Turbo-generator rotors typically have concentric rectangular coils mounted in slots in a rotor. The end portions of the coils (commonly referred to as "endwindings") that extend beyond the main rotor body are typically supported against rotational forces by a retaining ring. (See FIG. 1). Support blocks are placed intermittently between the concentric coil endwindings so as to maintain their relative positions and to add mechanical stability for axial loads such as thermal loads. (See FIG. 2). Additionally, the copper coils are constrained radially by the retaining ring about an outer radius so as to counteract the centrifugal forces.

The presence of the spaceblocks and the retaining rings results in a number of coolant regions exposed to the copper coils. The primary coolant path extends axially between the spindle and the bottom of the endwindings. Discrete cavities are formed between the coils by the bounding surfaces of the coils, the blocks, and the inner surface of the retaining ring structure. The endwindings are exposed to the coolant that is driven by the rotational forces from radially below the endwindings into these cavities. (See FIG. 3). According to computed flow pathlines, this heat transfer tends to be low because the coolant flow enters the cavity, traverses through a primary circulation path, and then exits the cavity. This circulation path results in low heat transfer coefficients especially near the center of the cavity. Thus, this means for heat removal about the endwindings it is relatively inefficient.

Various schemes have been used to route additional cooling gas through the rotor end region. These cooling schemes rely on either (1) making cooling passages directly in the copper conductors by machining grooves or forming channels in the conductors and then pumping the gas to some other region of the machine and/or (2) creating regions of relatively higher and lower pressures with the addition of baffles, flow channels, and pumping elements to force the cooling gas to pass over the conductor surfaces.

Some systems penetrate the highly stressed rotor retaining ring with radial holes so as to allow cooling gas to be pumped directly alongside the rotor endwindings and discharged into the air gap. Such systems, however, have only limited usefulness due to the high mechanical stress and fatigue considerations relating to the retaining ring.

If the conventional forced rotor end cooling schemes are used, considerable complexity and cost are added to rotor construction. For example, directly cooled conductors must be machined or fabricated to form the cooling passages. In addition, an exit manifold must be provided to discharge the gas somewhere in the rotor. The forced cooling schemes require the rotor end region to be divided into separate pressure zones, with the addition of numerous baffles, flow channels, and pumping elements. These elements again add complexity and cost.

If the forced or direct cooling schemes are not used, then the rotor endwindings should be cooled passively. Passive cooling relies on the centrifugal and rotational forces of the rotor to circulate gas in the blind, dead-end cavities formed between concentric rotor windings. Passive cooling of rotor endwindings is sometimes also called "free convection" cooling.

Although passive cooling provides the advantage of minimum complexity and cost, heat removal capability may be diminished when compared to the active systems of direct and forced cooling. Any cooling gas entering the cavities between the concentric rotor windings must exit through the same opening because these cavities are otherwise enclosed. The four "side walls" of a typical cavity are formed by the concentric conductors and the insulating blocks that separate them with the "bottom" (radially outward) wall formed by the retaining ring that supports the endwindings against rotation. Cooling gas enters from the annular space between the conductors and the rotor spindle. Heat removal is thus limited by the low circulation velocity of the gas in the cavity and the limited amount of the gas that can enter and leave these spaces.

In typical configurations, the cooling gas in the end region has not yet been fully accelerated to the rotor speed. As the fluid is driven into a cavity, the heat transfer coefficient is typically highest near the spaceblock that is downstream relative to the flow direction, i.e., where the fluid enters with the highest momentum and where the fluid coolant is the coldest. The heat transfer coefficient also is typically high around the cavity periphery while the center of the cavity receives the least amount of cooling.

Increasing the heat removal capability of the passive cooling systems will increase the current carrying capability of the rotor. This increase capability may provide increased rating capability of the generator as a whole while maintaining the advantage of low cost, simple, and reliable construction.

SUMMARY OF THE INVENTION

The present application thus describes a dynamoelectric machine cooled by a gas flow. The machine may include a rotor, an endwinding extending axially beyond the rotor, a spaceblock located about the endwinding, and a passageway positioned about the spaceblock. The spaceblock may include a C-channel extending into the passageway so as to deflect the gas flow into an axial direction.

The C-channel may include a pair of rectangular plates attached to the spaceblock. The spaceblock may include a height such that it does not protrude underneath the endwindings while the C-channels may protrude underneath the endwinding. The machine further may include a number of endwindings, a number of spaceblocks, a number of passageways, and a number of C-channels. Some of the spaceblocks may have one of the C-channels attached thereto and some may not.

The present application further describes a method of promoting a cooling flow in a dynamoelectric machine having a rotor and a number of spaceblocks. The method may include positioning a pair of paddles on one or more of the spaceblocks, rotating the rotor so as to generate the cooling flow with a relative tangential velocity, and deflecting the cooling flow with the paddles so as to reduce the relative tangential velocity such that the cooling flow is largely in an axial direction.

The present application further describes a dynamoelectric machine cooled by a gas flow. The machine may include a rotor, a number of coil endwindings extending axially beyond the rotor, a number of spaceblocks located about the coil endwinding, and a passageway positioned about one or more of the spaceblocks. One or more of the spaceblocks may include the paddles extending into the passageway so as to deflect the gas flow into an axial direction.

The paddles may include a pair of flat plates. The spaceblocks may have a height such that they do not protrude underneath the coil endwindings while the paddles may protrude underneath the coil endwindings. Some of the spaceblocks have the paddles attached thereto and some of the spaceblocks do not.

DETAILED DESCRIPTION OF THE INVENTION

Figure 1:
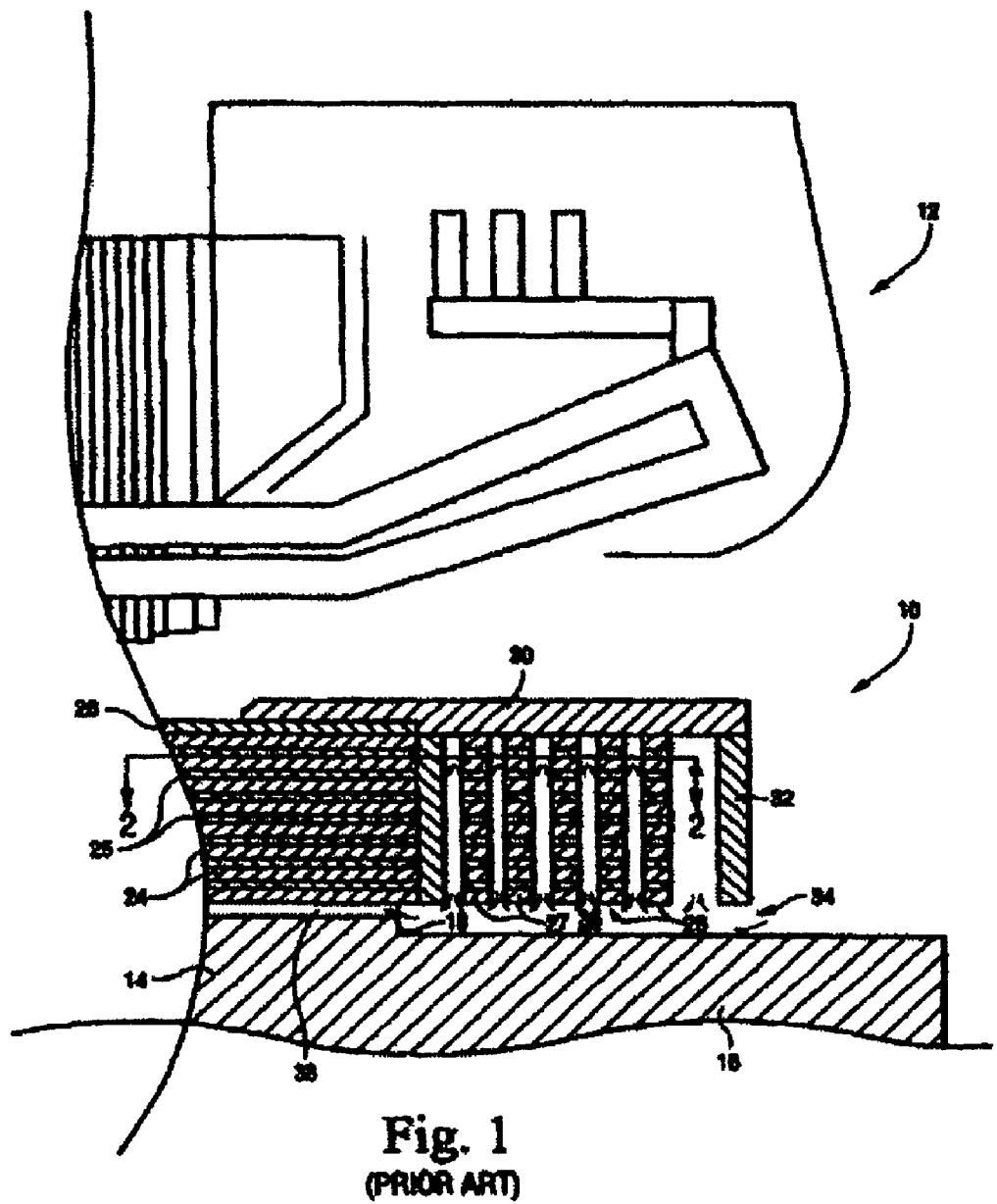
FIG. 1 is a cross-sectional view of a portion of the end turn region of a dynamoelectric machine rotor with a stator in opposed facing relation thereto.
Figure 2:
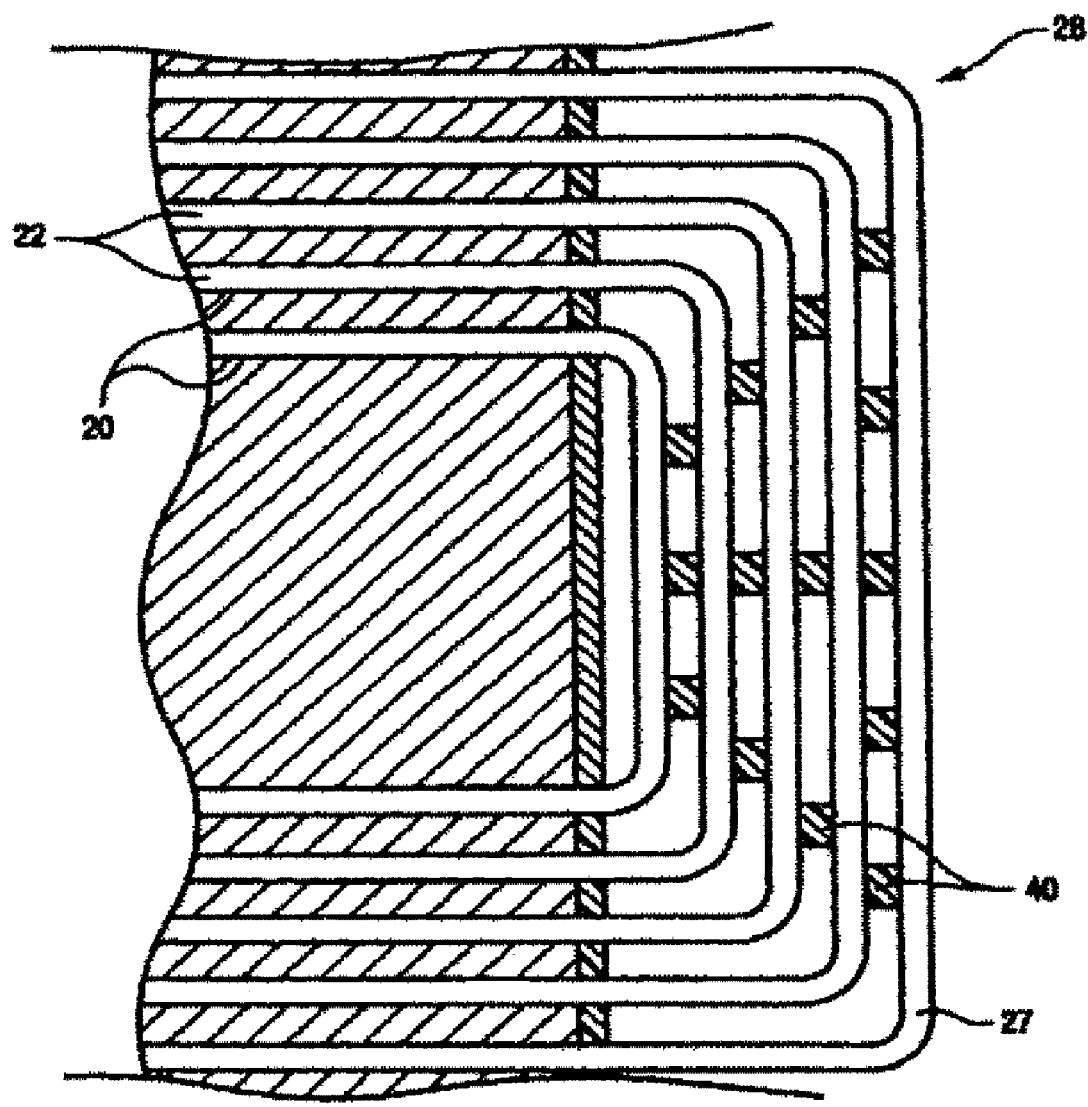
FIG. 2 is a cross-sectional top view of the dynamoelectric machine rotor taken along line 2-2 of FIG. 1.

Referring now to the drawings, in which like numerals refer to like elements throughout the several views, FIGS. 1 and 2 show a rotor 10 for a gas-cooled dynamoelectric machine. The general operation of dynamoelectric machines such as large turbo-generators is well known. The rotor 10 includes a stator 12 surrounding the rotor 10. The rotor 10 includes a generally cylindrical body portion 14 centrally disposed on a rotor spindle 16 and having axially opposing end faces, of which a portion 18 of one end face is shown in FIG. 1. The body portion 18 is provided with a number of circumferentially spaced, axially extending slots 20 for receiving concentrically arranged coils 22. The coils 22 make up the rotor winding. For clarity, only five rotor coils 22 are shown, although several more are commonly used in practice.

A number of conductor bars 24 may be stacked in each one of the slots 20. Layers of electrical insulation 25 may separate the adjacent conductor bars 24. The stacked conductor bars 24 typically are maintained in the slots 20 by a number of wedges 26 (FIG. 1) and may be made of a conductive material such as copper. The conductor bars 24 are interconnected at each opposing end of the body portion 18 by end turns 27. The end turns 27 extend axially beyond the end faces to form a number of stacked endwindings 28. Layers of electrical insulation also separate the end turns 27.

Referring again to FIG. 1, a retaining ring 30 may be disposed around the end turns 27 at each end of the body portion 18 to hold the endwindings 28 in place against centrifugal forces. The retaining ring 30 may be fixed at one end to the body portion 18 and may extend out over the rotor spindle 16. A centering ring 32 may be attached to the distal end of the retaining ring 30. It should be noted that the retaining ring 30 and the centering ring 32 also may be mounted in other ways known in the art. The inner diameter of the centering ring 32 may be radially spaced from the rotor spindle 16 so as to form a gas inlet passage 34. The endwindings 28 may be spaced from the spindle 16 so as to define an annular region 36. A number of axial cooling channels 38 may be formed along the slots 20. The channels 38 may be in fluid communication with the gas inlet passage 34 via the annular region 36 so as to deliver cooling gas to the coils 22.

Turning to FIG. 2, the endwindings 28 at each end of the rotor 10 may be circumferentially and axially separated by a number of spacers or spaceblocks 40. (For clarity of illustration, the spaceblocks 40 are not shown in FIG. 1). The spaceblocks 40 may be elongated blocks of an insulating material. The spaceblocks 40 may be located in the spaces between adjacent endwindings 28 and may extend beyond the full radial depth of the endwindings 28 into the annular gap 36. Accordingly, the spaces between the concentric stacks of the end turns 27(hereinafter endwindings) are divided into cavities. These cavities may be bounded on the top by the retaining ring 30 and on four sides by the adjacent endwindings 28 and the adjacent spaceblocks 40.

Figure 3:
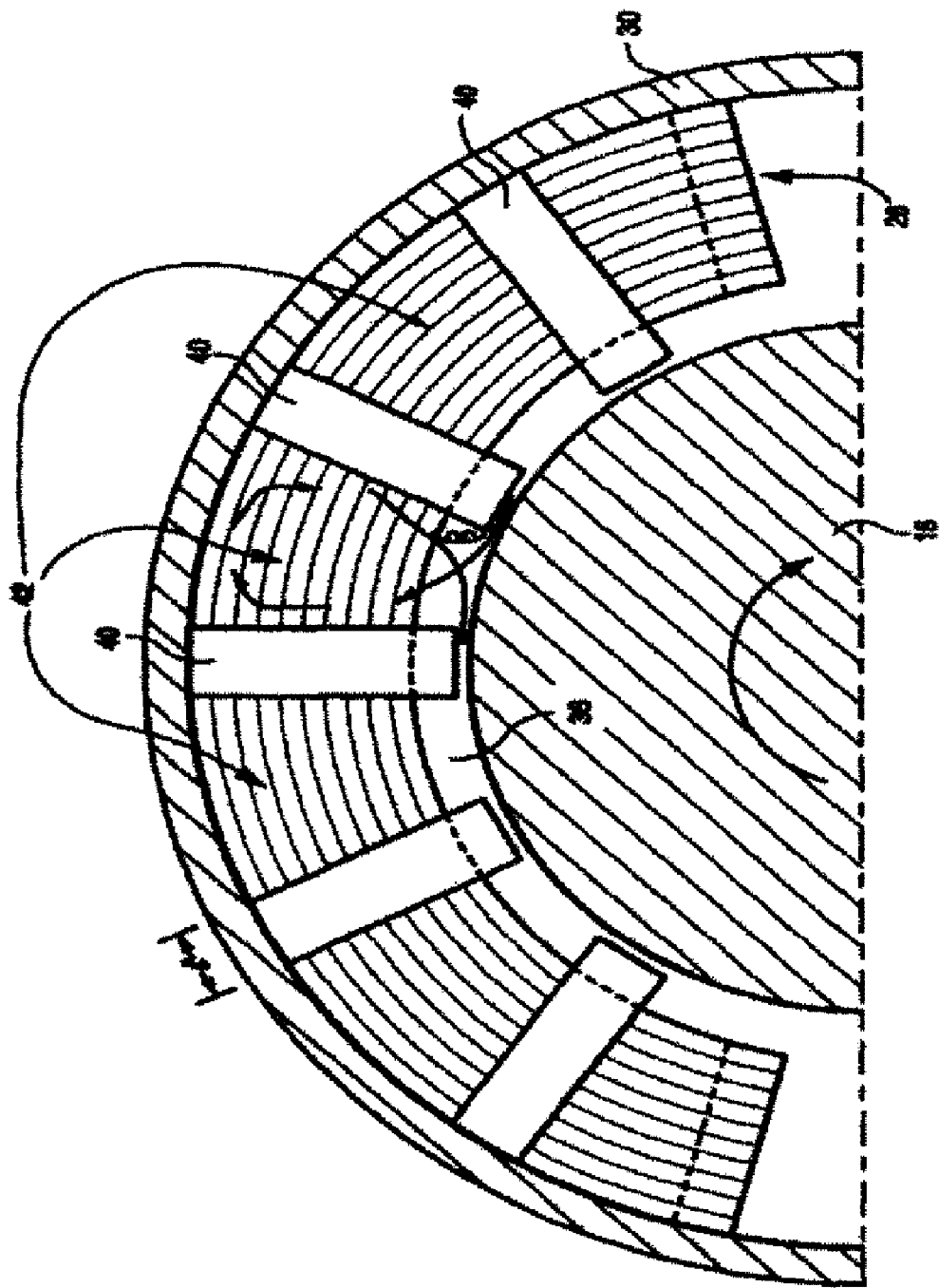
FIG. 3 is a schematic illustration showing passive gas flow into and through endwinding cavities.
Figure 4:
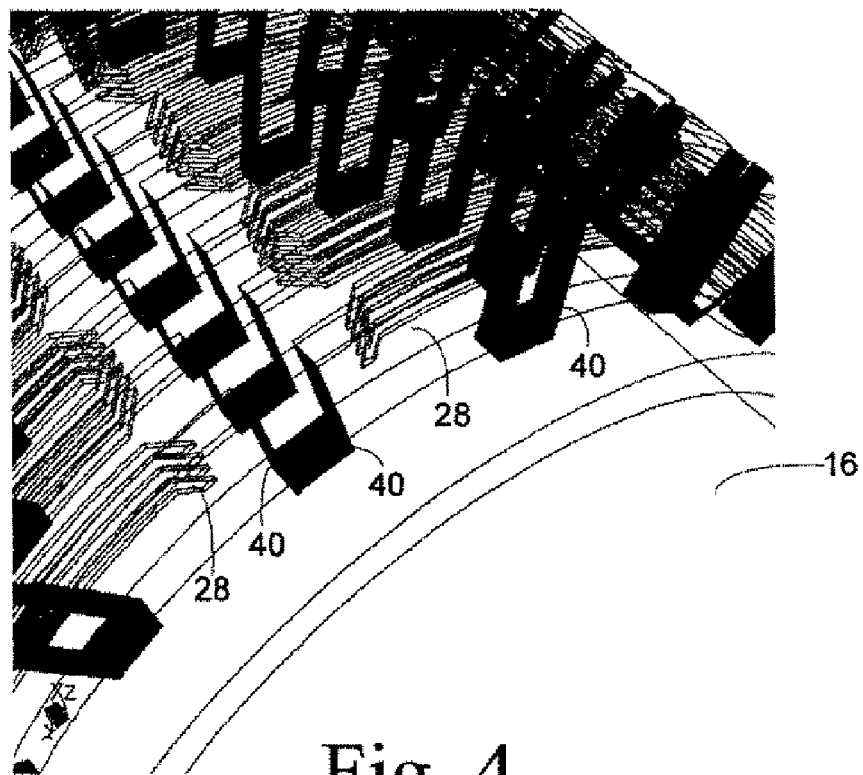
FIG. 4 is a perspective view of the rotor, the endwinding, and the spaceblocks.

As best seen in FIG. 1, each of these cavities is in fluid communication with the gas inlet passage 34 via the annular region 36. The arrows in FIG. 1 show the airflow. A portion of the cooling gas entering the annular region 36 between the endwinding 28 and the rotor spindle 16 thus enters the cavities 42, circulates therein, and then returns to the annular region 36. As is schematically shown with the arrows in FIG. 3, the inherent pumping action and the rotational forces acting in a rotating generator cavity produce a large single flow circulation cell. FIG. 4 shows a perspective view.

The rotor 16 may rotate at about 3000-3600 rpm depending upon the output frequency. At these speeds, the flow beneath the coils 22 in the region of the endwindings 28 travels at a high relative tangential velocity. As such, when the flow reaches the cavities 42, the flow may enter at an angle. This misalignment between the flow and the cavities 42 thus may induce cooling losses.

Figure 5:
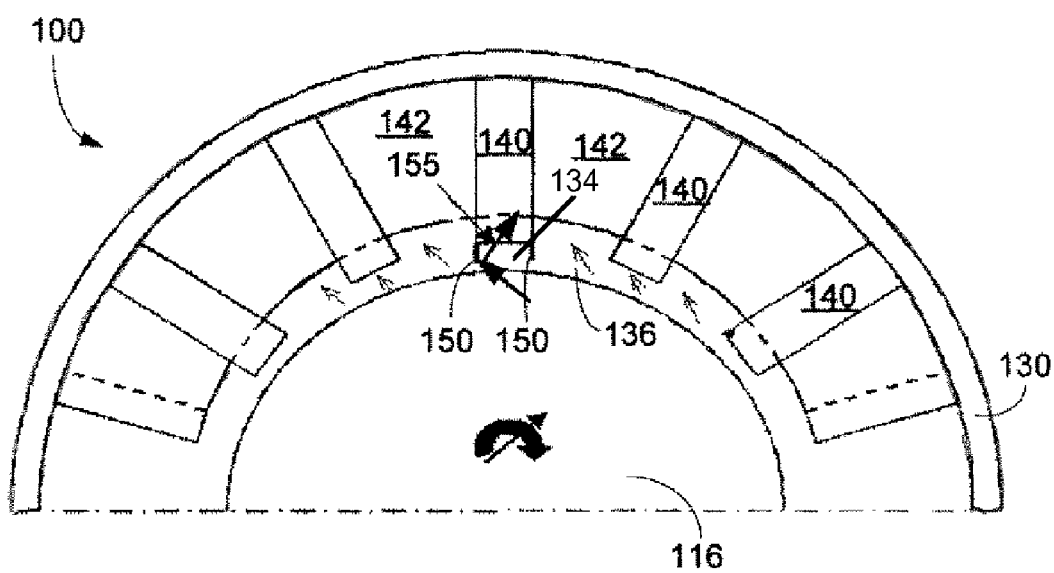
FIG. 5 is a schematic illustration showing passive gas flow about the spaceblocks with the paddles attached thereto as is described herein.
Figure 6:
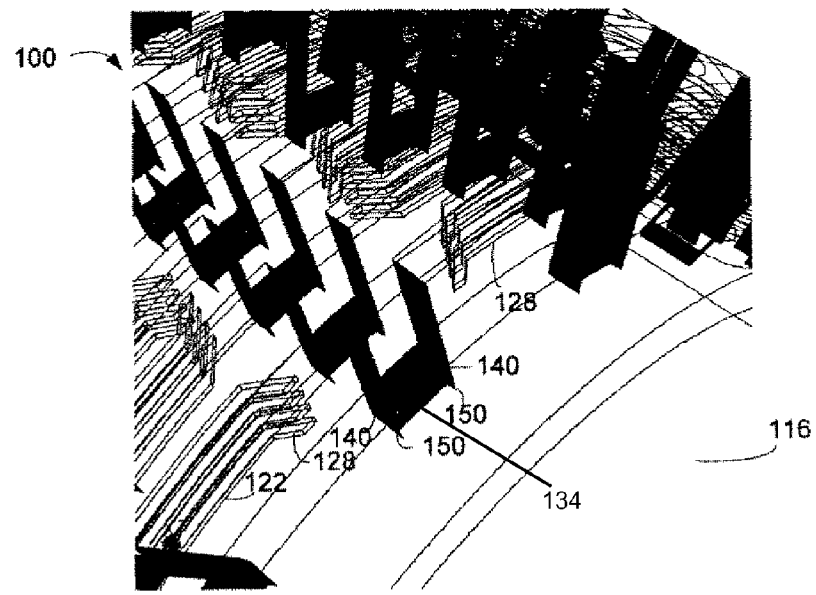
FIG. 6 is a perspective view of the spaceblocks with the paddles attached thereto.

FIGS. 5 and 6 show a dynamoelectric machine 100 as is described herein. Similarly to those described above, the machine 100 includes a rotor 116, a number of coils 122 with the endwindings 128, and an annular region 136 positioned therebetween. The machine 100 further includes number of spaceblocks 140, a gas inlet passage 134 positioned thereabout, and a number of cavities 142.

A pair of paddles 150 may be positioned beneath the spaceblocks 140. The paddles 150 may be bolted onto the bottom of the spaceblocks 140 or otherwise attached. The paddles 150 may take the form of rectangular flat plates and may be in the form of a C-shaped channel 155 ("a C-channel") formed underneath the spaceblocks 140. Similar shapes may be used herein.

The paddles 150 form a guiding channel such that the cooling flow will be diverted into the gas inlet passage 134 in a largely axial direction. Such an axial flow allows entrance into the passage 134 with minimum cooling losses.

The absolute tangential velocity of the cooling flow thus is enhanced and the relative tangential velocity is reduced. The axial flow reduces flow pressure loses at the entrance to the passage 134. The addition of the paddles 150 should not affect the heat transfer of the cavities 142 because such is mainly governed by turbulence and radial velocity.

Figure 7:
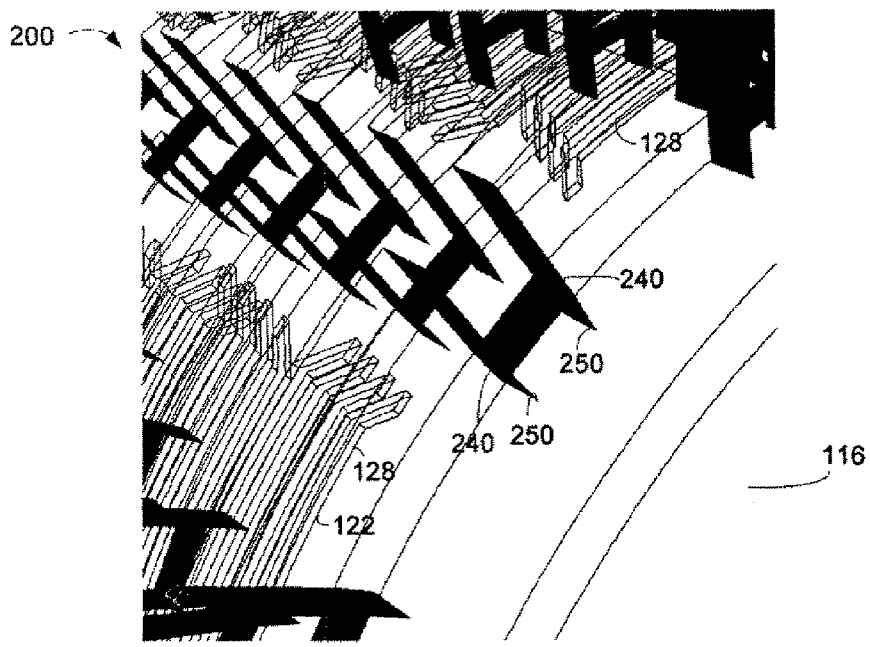
FIG. 7 is a perspective view of an alternative embodiment of the spaceblocks described herein.

FIG. 7 shows a further embodiment of a machine 200. In known machines as is described above, the spaceblocks 140 generally protrude below the inner radius of the coils 122. This protrusion may obstruct the flow beneath the coils 122. In this embodiment, a spaceblock 240 has a reduced height so as not to protrude beneath the coils 122. A pair of paddles 250 is then added into the flow path so as to promote further the reduction of pressure losses.

Figure 8:
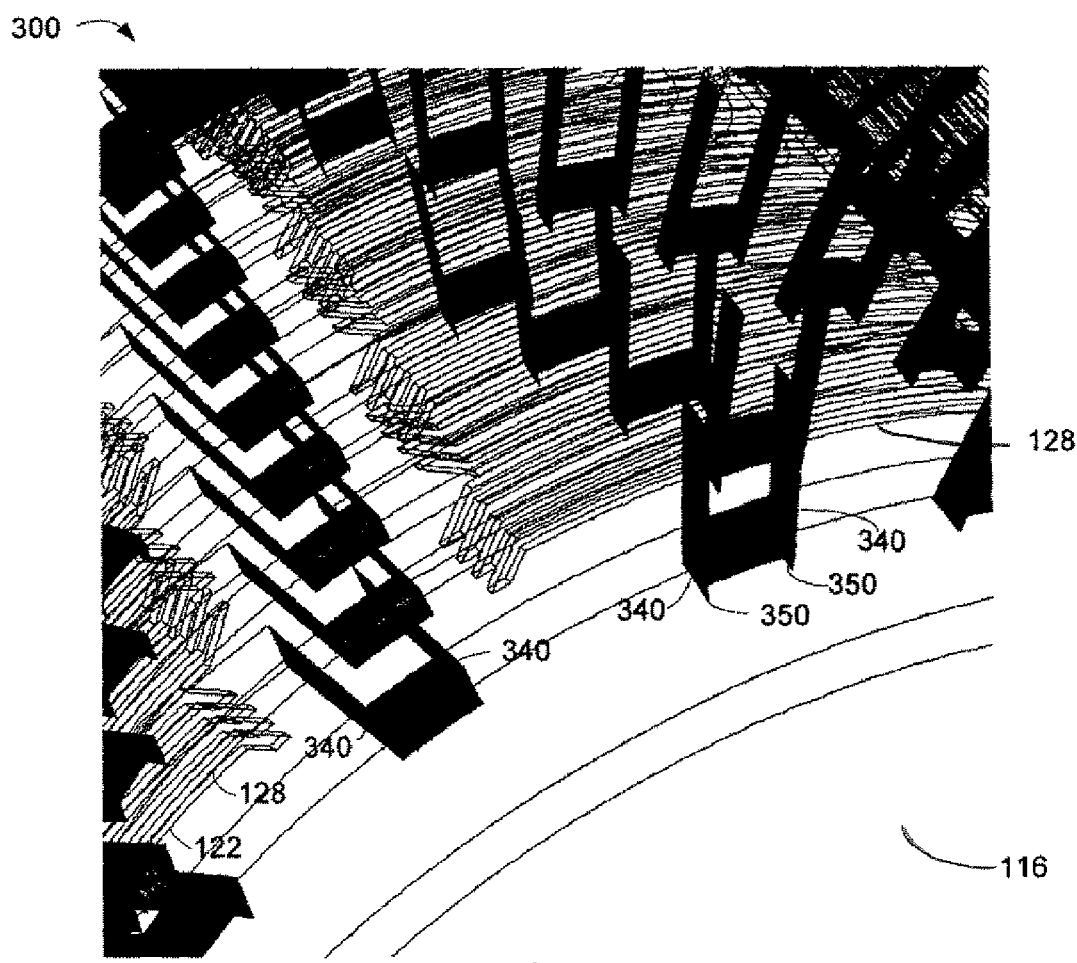
FIG. 8 is a perspective view of a further alternative embodiment of the spaceblocks described herein.

FIG. 8 shows a further embodiment of a machine 300. The machine 300 includes a number of spaceblocks 340. In this embodiment, the spaceblocks 340 are selectively fitted with the paddles 350. For example, the spaceblock 340 along the pole axis need not be fitted with the paddles 350. Different configurations also may be used.

Simulated flow models show that the use of the paddles 150, 250, 350 may provide an improvement in the pressure loss coefficient based on inlet velocity. Improvements of about 26% have been found. Other types of generator designs may exhibit even greater benefits. The paddles 150, 250, 350 may be used on any type of air-cooled or hydrogen cooled generators. The paddles 150, 250, 350 promote less flow loss and hence more ventilation efficiency for the machines 100, 200, 300 as a whole. The overall efficiency of the machine also will increase as it is the function of ventilation efficiency. Ultimately, the cost of electricity may be reduced for end customers.

It should be understood that the foregoing relates only to the exemplary embodiments of the present application and that numerous changes and modifications may be made herein without departing from the general spirit and scope of the invention as defined by the following claims and the equivalents thereof.

What is claimed is:

1. A dynamoelectric machine cooled by a gas flow, comprising:
   a rotor;
   an endwinding extending axially beyond the rotor;
   a spaceblock located about the endwinding;
   a passageway positioned about the spaceblock; and
   the spaceblock comprising a C-channel extending into the passageway so as to deflect the gas flow into an axial direction.

2. The machine of claim 1, wherein the C-channel comprises a pair of rectangular plates attached to the spaceblock.

3. The machine of claim 1, wherein the spaceblock comprises a height such that it does not protrude underneath the endwinding.

4. The machine of claim 1, wherein the C-channel protrudes underneath the endwinding.

5. The machine of claim 1, further comprising a plurality of endwindings, a plurality of spaceblocks, and a plurality of passageways.

6. The machine of claim 5, further comprising a plurality of C-channels such that some of the plurality of spaceblocks have one of the plurality of C-channels attached thereto and some of the plurality of spaceblocks do not have one of the plurality of C-channels attached thererto.

7. A method of promoting a cooling flow in a dynamoelectric machine having a rotor and a number of spaceblocks, comprising:
   positioning a pair of paddles on one or more of the number of spaceblocks;
   rotating the rotor so as to generate the cooling flow with a relative tangential velocity; and
   deflecting the cooling flow with the pair of paddles so as to reduce the relative tangential velocity such that the cooling flow is largely in an axial direction.

8. A dynamoelectric machine cooled by a gas flow, comprising:
   a rotor;
   a plurality of coil endwindings extending axially beyond the rotor;
   a plurality of spaceblocks located about the plurality of coil endwinding;
   a passageway positioned about one or more of the plurality of spaceblocks; and
   one or more of the plurality of spaceblocks comprising a plurality of paddles extending into the passageway so as to deflect the gas flow into an axial direction.

9. The machine of claim 8, wherein the plurality of paddles comprises a pair of flat plates.

10. The machine of claim 8, wherein the plurality of spaceblocks comprises about a height such that the plurality of spaceblocks does not protrude underneath the plurality of coil endwindings.

11. The machine of claim 8, wherein the plurality of paddles protrudes underneath the plurality of coil endwindings.

12. The machine of claim 8, wherein some of the plurality of spaceblocks have the plurality of paddles attached thereto and some of the plurality of spaceblocks do not have the plurality of paddles attached thererto.

* * * * *